J. K. McLANAHAN.

Lubricating Wheels and Pulleys.

No. 6,203. Reissued Jan. 5, 1875.

WITNESSES

E. Upham.

Ist Everett.

By

INVENTOR

J. King McLanahan.

Chipman Brown & Co

Attorney

UNITED STATES PATENT OFFICE.

J. KING McLANAHAN, OF HOLLIDAYSBURG, PENNSYLVANIA.

IMPROVEMENT IN LUBRICATING WHEELS AND PULLEYS.

Specification forming part of Letters Patent No. 143,830, dated October 21, 1873; reissue No. 6,203, dated January 5, 1875; application filed April 11, 1874.

*To all whom it may concern:*

Figure 1:
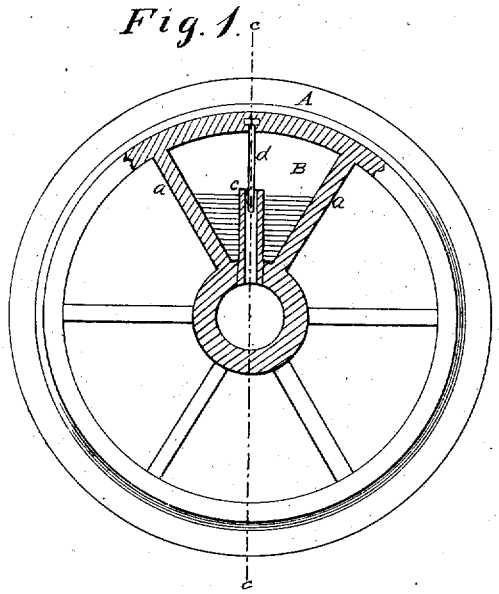
Figure 2:
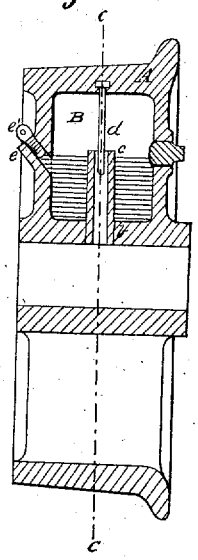
Figure 3:
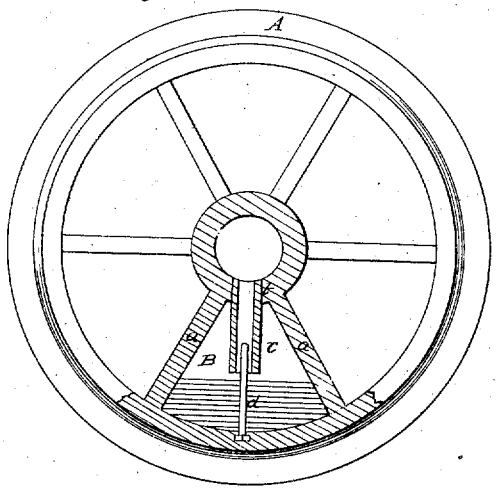

Be it known that I, J. KING McLANAHAN, of Hollidaysburg, in the county of Blair and State of Pennsylvania, have invented a new and Improved Self-Lubricator Wheel or Pulley, of which the following is a specification:

In the accompanying drawings, Figure 1 represents a front elevation of a revolving wheel or pulley, partly in section on the line *c c*. Fig. 2 represents a vertical transverse section; and Fig. 3 represents a front view in part section, with the lubricator shown revolved below the axle.

This invention has relation to means for lubricating the wheels of cars and other vehicles, pulleys, &c.; and it consists in providing the wheel with an oil-chamber having a feeding-hole, by which it communicates with the surface of the axle, and having within said hole a feeding-wire, which, by the revolution of the wheel, will be brought in contact with the oil to receive a supply thereof upon its surface, which is, as the wheel continues to revolve, fed into the above-mentioned hole. The invention, therefore, consists in the combination of the feeding-stem with the oil-conducting tube of a revolving pulley or wheel.

In the drawings, the letter A represents the wheel, pulley, or other revolving body in which the oil-chamber or lubricator is formed. This may be done by connecting two adjoining spokes or arms, *a*, or by forming an annular box around the hub.

The oil-chamber may be cast with the wheel, or separately constructed, and attached thereto afterward.

The feeding-aperture *b* serves as a means of communication between the oil-chamber and the axle-box. Within this aperture is located a feeding-wire, *d*, of less diameter than the feeding-passage, and so arranged that when the wheel is revolved to bring the feed-passage below the axle, as shown in Fig. 3 of the drawings, its exposed portion will be in the oil, which has now gravitated to the peripheral part of the oil-chamber, and so that when the revolution of the wheel is continued, bringing the feed-passage above the axle-box, the portion of the wire which is within the tube or passage will lead or conduct the oil thereon, gradually feeding it to the surface of the axle.

By means of an inclined side aperture, *e*, with a screw-stopper, *e'*, the refilling of the box B is accomplished, and the quantity of oil therein easily regulated. This lubricator is quickly and easily attended to, and is reliable and economical in operation. The feeding-stem *d* may be fixed to the wheel, or it may be arranged to play loosely in the tube.

What I claim as my invention, and desire to secure by Letters Patent, is—

The combination, with a wheel and its oil-chamber revolving therewith, and having a feeding-passage leading to the axle, of a feeding-stem extending into said feeding-passage, and serving, at each revolution of the wheel alternately to dip into the oil, and to feed the dipped portion into said feeding-passage, substantially as specified.

In testimony that I claim the above I have hereunto subscribed my name in the presence of two witnesses.

J. KING McLANAHAN.

Attest:
WILLIAM C. BAYLEY,
JAMES C. FITZ GERALD.